United States Patent
Zhu et al.

(10) Patent No.: US 10,422,999 B2
(45) Date of Patent: Sep. 24, 2019

(54) FREEFORM SURFACE OFF-AXIAL THREE-MIRROR IMAGE-SIDE TELECENTRIC OPTICAL SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 138 days.

(21) Appl. No.: 15/706,740

(22) Filed: Sep. 17, 2017

(65) Prior Publication Data
US 2018/0180898 A1    Jun. 28, 2018

(30) Foreign Application Priority Data
Dec. 22, 2016    (CN) .......................... 2016 1 1213649

(51) Int. Cl.
*G02B 27/22* (2018.01)
*G02B 27/64* (2006.01)
*G02B 27/09* (2006.01)
*G02B 27/58* (2006.01)
*G02B 13/22* (2006.01)
*G02B 17/06* (2006.01)

(52) U.S. Cl.
CPC ............. *G02B 27/22* (2013.01); *G02B 13/22* (2013.01); *G02B 17/0642* (2013.01); *G02B 27/0977* (2013.01); *G02B 27/58* (2013.01); *G02B 27/64* (2013.01)

(58) Field of Classification Search
CPC .... G02B 27/22; G02B 13/22; G02B 17/0642; G02B 27/58; G02B 27/0977; G02B 27/64
USPC .................................................... 359/850
See application file for complete search history.

(56) References Cited

U.S. PATENT DOCUMENTS

2015/0253552 A1*  9/2015  Zhu .................. G01J 1/0414
                                                          250/216

* cited by examiner

*Primary Examiner* — Jade R Chwasz
*Assistant Examiner* — Rahman Abdur
(74) *Attorney, Agent, or Firm* — ScienBiziP, P.C.

(57) ABSTRACT

A freeform surface off-axial three-mirror image-side telecentric optical system comprises a primary mirror, a secondary mirror, a tertiary mirror and an image sensor. The secondary mirror is the aperture stop. A reflective surface of the primary mirror is a fourth-order polynomial freeform surface of xy. Each of a reflective surface of the secondary mirror and a reflective surface of the tertiary mirror is a sixth-order polynomial freeform surface of xy.

18 Claims, 3 Drawing Sheets

US 10,422,999 B2

FREEFORM SURFACE OFF-AXIAL THREE-MIRROR IMAGE-SIDE TELECENTRIC OPTICAL SYSTEM

CROSS-REFERENCE TO RELATED APPLICATIONS

This application claims all benefits accruing under 35 U.S.C. § 119 from China Patent Application No. 201611213649.7, field on Dec. 22, 2016 in the China Intellectual Property Office, disclosure of which is incorporated herein by reference.

FIELD

The present disclosure relates to a freeform surface off-axial three-mirror image-side telecentric optical system.

BACKGROUND

An image-side telecentric optical system has important applications. For example, the image-side telecentric optical system can be used to eliminate a change in system magnification caused by an axial displacement of an image plane. The image-side telecentric optical system can enhance a relative illumination of an image plane in an entire field of view. The image-side telecentric optical system can be used to eliminate unevenness of CCD color in RGB three-color.

If the image-side telecentric system is combined with an off-axis three-mirror optical system, the color difference can be reduced and the central obscuration can be eliminated. However, the optical system will produce a series of asymmetric aberrations after off-axis, and it is difficult to use conventional rotationally symmetric surfaces to correct the asymmetric aberrations. In addition, the image-side telecentric will increase the design difficulty of the off-axis three-mirror optical system.

BRIEF DESCRIPTION OF THE DRAWINGS

Implementations of the present technology will now be described, by way of example only, with reference to the attached figures.

DETAILED DESCRIPTION

Figure 1:
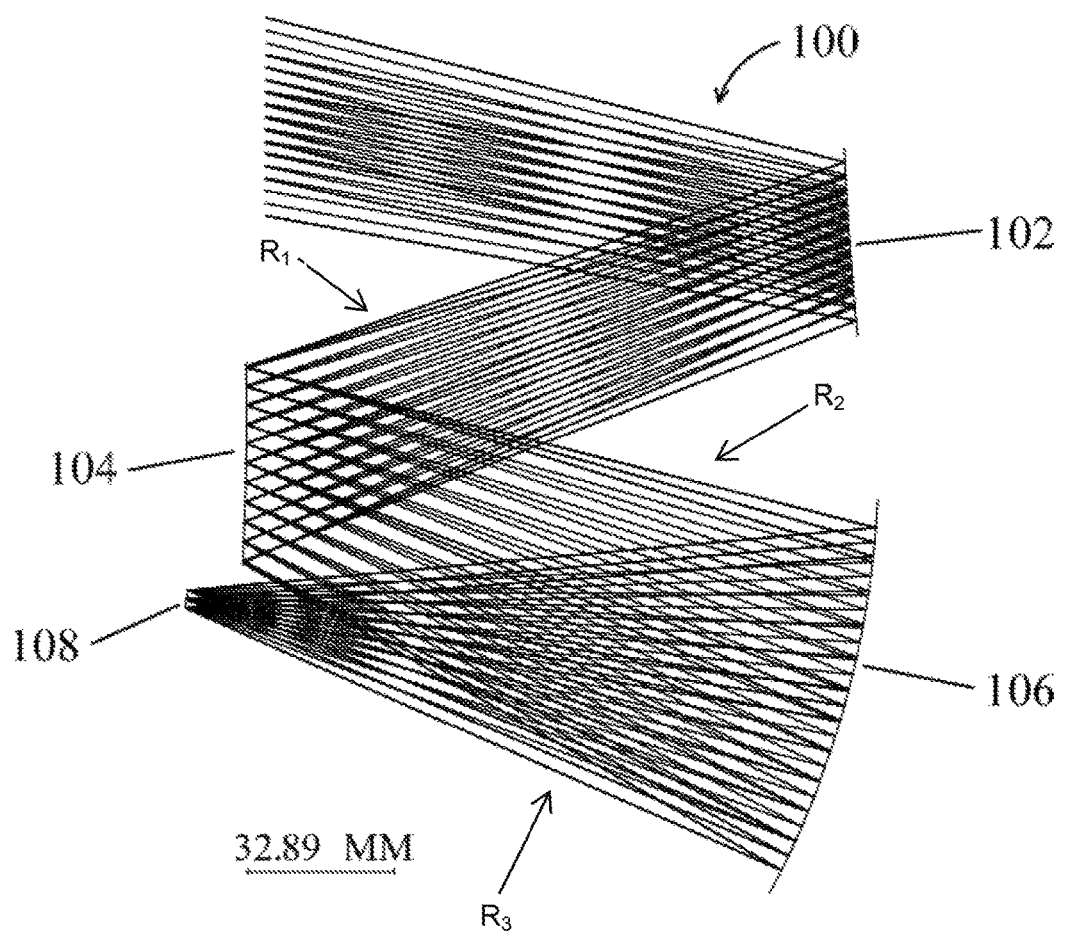
FIG. 1 is a schematic view of a light path of a freeform surface off-axial three-mirror image-side telecentric optical system according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
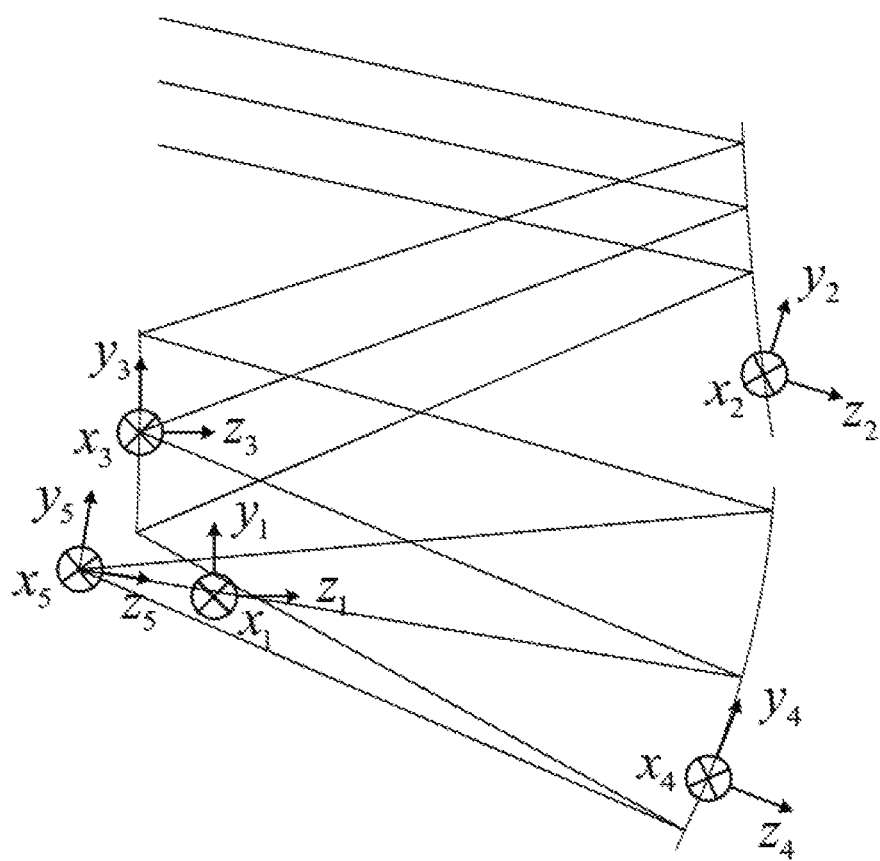
FIG. 2 is a schematic view of a configuration of a freeform surface off-axial three-mirror image-side telecentric optical system according to one embodiment.

The present disclosure is described in relation to a freeform surface off-axial three-mirror image-side telecentric optical system 100. The freeform surface off-axial three-mirror image-side telecentric optical system 100 includes a primary mirror 102, a secondary mirror 104, a tertiary mirror 106, and an image sensor 108 as shown in FIGS. 1 and 2. The secondary mirror 104 is located on a reflected light path of the primary mirror 102. The tertiary mirror 106 is located on a reflected light path of the secondary mirror 104. The image sensor 108 is located on a reflected light path of the tertiary mirror 106. A reflective surface of the primary mirror 102, a reflective surface of the secondary mirror 104 and a reflective surface of the tertiary mirror 106 are all freeform surfaces. Freeform surfaces are asymmetric surfaces and have more degrees of freedom for optical design, which can reduce the asymmetric aberrations and simplify a structure of the freeform surface off-axial three-mirror image-side telecentric optical system 100.

A light path of the freeform surface off-axial three-mirror image-side telecentric optical system 100 can be depicted as follows. Firstly, the light comes from the object reaches the reflective surface of the primary mirror 102, and is reflected by the primary mirror 102 to form a first reflected light $R_1$. Secondly, the first reflected light $R_1$ reaches the secondary mirror 104, and is reflected by the secondary mirror 104 to form a second reflected light $R_2$. Thirdly, the second reflected light $R_2$ reaches the tertiary mirror 106, and is reflected by the tertiary mirror 106 to form a third reflected light $R_3$. Finally, the third reflected light $R_3$ is received by the image sensor 108 and imaging. An exit pupil of the freeform surface off-axial three-mirror image-side telecentric optical system 100 is approximately located at an infinite distance. An incident angle of each field of view on an image plane is about 0°. The secondary mirror 104 is the aperture stop.

A first three-dimensional rectangular coordinates system $(x_1, y_1, z_1)$ is defined in space. A $z_1$-axis is along a horizontal line, in the $z_1$-axis, to the left is negative, and to the right is positive. An $y_1$-axis is in a plane as shown in FIG. 2, in the $y_1$-axis, to the upward is positive, and to the downward is negative. An $x_1$-axis is perpendicular to an $y_1z_1$ plane, in the $x_1$-axis, in a direction substantially perpendicular to the $y_1z_1$ plane, to the inside is positive, and to the outside is negative.

In space relative to the first three-dimensional rectangular coordinates system $(x_1, y_1, z_1)$, a second three-dimensional rectangular coordinates system $(x_2, y_2, z_2)$ is defined by a primary mirror location, a third three-dimensional rectangular coordinates system $(x_3, y_3, z_3)$ is defined by a secondary mirror location, a fourth three-dimensional rectangular coordinates system $(x_4, y_4, z_4)$ is defined by a tertiary mirror location, and a fifth three-dimensional rectangular coordinates system $(x_5, y_5, z_5)$ is defined by an image sensor location.

A second origin of the second three-dimensional rectangular coordinates system $(x_2, y_2, z_2)$ is in (0, 49.39999, 122.92696) position of the first three-dimensional rectangular coordinates system $(x_1, y_1, z_1)$, whose unit is millimeter. A $z_2$-axis positive direction rotates about 17.01294 degrees along a clockwise direction relative to a $z_1$-axis positive direction.

A third origin of the third three-dimensional rectangular coordinates system $(x_3, y_3, z_3)$ is in (0, 36.69253, −16.46708) position of the first three-dimensional rectangular coordinates system $(x_1, y_1, z_1)$, whose unit is millimeter. A $z_3$-axis positive direction rotates about 0.74805 degrees along a counterclockwise direction relative to the $z_1$-axis positive direction.

A fourth origin of the fourth three-dimensional rectangular coordinates system $(x_3, y_3, z_3)$ is in (0, −44.59531, −47.02867) position of the first three-dimensional rectangular coordinates system $(x_1, y_1, z_1)$, whose unit is millimeter. A $z_4$-axis positive direction rotates about 22.31491 degrees along the clockwise direction relative to the $z_1$-axis positive direction.

A fifth origin of the fifth three-dimensional rectangular coordinates system $(x_5, y_5, z_5)$ is in (0, 6.13399, −29.9344) position of the first three-dimensional rectangular coordinates system $(x_1, y_1, z_1)$, whose unit is millimeter. A $z_5$-axis positive direction rotates about 9.11067 degrees along the clockwise direction relative to the $z_1$-axis positive direction.

In the second three-dimensional rectangular coordinates system $(x_2, y_2, z_2)$, the reflective surface of the primary mirror 102 is a fourth-order polynomial freeform surface of $x_2y_2$. The fourth-order polynomial freeform surface of $x_2y_2$ can be expressed as follows:

$$z_2(x_2, y_2) = \frac{c(x_2^2 + y_2^2)}{1 + \sqrt{1 - (1+k)c^2(x_2^2 + y_2^2)}} + A_2 y_2 +$$
$$A_3 x_2^2 + A_5 y_2^2 + A_7 x_2^2 y_2 + A_9 y_2^3 + A_{10} x_2^4 + A_{12} x_2^2 y_2^2 + A_{14} y_2^4.$$

In the fourth-order polynomial freeform surface of $x_2y_2$, z represents surface sag, c represents surface curvature, k represents conic constant, while $A_i$ represents the ith term coefficient. The freeform surface off-axial three-mirror image-side telecentric optical system 100 is symmetrical about $y_2z_2$ plane, thus, in the fourth-order polynomial freeform surface of $x_2y_2$, only the even-order terms of $x_2$ are retained. In one embodiment, the values of c, k, and $A_i$ in the equation of the fourth-order polynomial of $x_2y_2$ are listed in TABLE 1. However, the values of c, k, and A in the fifth-order polynomial polynomial freeform surface of $x_2y_2$ are not limited to TABLE 1.

TABLE 1

| c | 2.8642059856E−03 |
|---|---|
| k | −3.9274297376E+00 |
| A2 | −4.5435688039E−01 |
| A3 | −5.3806292422E−04 |
| A5 | −4.3722756320E−04 |
| A7 | −3.0530404587E−06 |
| A9 | 2.3737900997E−07 |
| A10 | 8.5265458822E−09 |
| A12 | 1.9066201794E−08 |
| A14 | 5.7547889567E−09 |

In the third three-dimensional rectangular coordinates system $(x_3, y_3, z_3)$, the reflective surface of the secondary mirror 104 is a sixth-order polynomial freeform surface of $x_3y_3$. The sixth-order polynomial freeform surface of $x_3y_3$ can be expressed as follows:

$$z_3(x_3, y_3) = \frac{c(x_3^2 + y_3^2)}{1 + \sqrt{1 - (1+k)c^2(x_3^2 + y_3^2)}} + A_2 y_3 + A_3 x_3^2 +$$
$$A_5 y_3^2 + A_7 x_3^2 y_3 + A_9 y_3^3 + A_{10} x_3^4 + A_{12} x_3^2 y_3^2 + A_{14} y_3^4 + A_{16} x_3^4 y_3 +$$
$$A_{18} x_3^2 y_3^3 + A_{20} y_3^5 + A_{21} x_3^6 + A_{23} x_3^4 y_3^2 + A_{25} x_3^2 y_3^4 + A_{27} y_3^6.$$

In the sixth-order polynomial freeform surface of $x_3y_3$, $z_3$ represents surface sag, c represents surface curvature, k represents conic constant, while $A_i$ represents the ith term coefficient. The freeform surface off-axial three-mirror image-side telecentric optical system 100 is symmetrical about $y_3z_3$ plane, thus, in the sixth-order polynomial freeform surface of $x_3y_3$, only the even-order terms of $x_3$ are retained. In one embodiment, the values of c, k, and A in the sixth-order polynomial of $x_3y_3$ are listed in TABLE 2. However, the values of c, k, and $A_i$ in the sixth-order polynomial freeform surface of $x_3y_3$ are not limited to TABLE 2.

TABLE 2

| c | −1.3509388901E−03 |
|---|---|
| k | 8.7720946581E+01 |
| A2 | 2.9521719735E−02 |
| A3 | −3.0546252140E−04 |
| A5 | −2.5168419021E−05 |
| A7 | −3.9838626726E−06 |
| A9 | −9.4441737760E−07 |
| A10 | −3.4439768073E−08 |
| A12 | −4.6398109825E−08 |
| A14 | −1.5721550120E−08 |
| A16 | −3.0796040892E−10 |
| A18 | −3.4167907065E−10 |
| A20 | −8.6127469499E−11 |
| A21 | −9.4044204706E−13 |
| A23 | −8.7321134718E−13 |
| A25 | 4.0516919551E−13 |
| A27 | 5.5914310564E−13 |

In the fourth three-dimensional rectangular coordinates system $(x_4, y_4, z_4)$, the reflective surface of the tertiary mirror 106 is a sixth-order polynomial freeform surface of $x_4y_4$. The sixth-order polynomial freeform surface of $x_4y_4$ can be expressed as follows:

$$z_4(x_4, y_4) = \frac{c(x_4^2 + y_4^2)}{1 + \sqrt{1 - (1+k)c^2(x_4^2 + y_4^2)}} + A_2 y_4 + A_3 x_4^2 +$$
$$A_5 y_4^2 + A_7 x_4^2 y_4 + A_9 y_4^3 + A_{10} x_4^4 + A_{12} x_4^2 y_4^2 + A_{14} y_4^4 + A_{16} x_4^4 y_4 +$$
$$A_{18} x_4^2 y_4^3 + A_{20} y_4^5 + A_{21} x_4^6 + A_{23} x_4^4 y_4^2 + A_{25} x_4^2 y_4^4 + A_{27} y_4^6.$$

In the sixth-order polynomial freeform surface of $x_4y_4$, $z_4$ represents surface sag, c represents surface curvature, k represents conic constant, while $A_i$ represents the ith term coefficient. The freeform surface off-axial three-mirror image-side telecentric optical system 100 is symmetrical about $y_4z_4$ plane, thus, in the sixth-order polynomial freeform surface of $x_4y_4$, only the even-order terms of $x_4$ are retained. In one embodiment, the values of c, k, and $A_i$ in the sixth-order polynomial of $x_4y_4$ are listed in TABLE 3. However, the values of c, k, and $A_i$ in the sixth-order polynomial freeform surface of $x_4y_4$ are not limited to TABLE 3.

TABLE 3

| | |
|---|---|
| c | −6.0303569933E−03 |
| k | −2.2371952711E−01 |
| $A_2$ | −2.2430352958E−03 |
| $A_3$ | 5.4714931736E−04 |
| $A_5$ | 5.6853894214E−04 |
| $A_7$ | 4.4859214867E−07 |
| $A_9$ | 8.3542437405E−07 |
| $A_{10}$ | 2.7604507475E−09 |
| $A_{12}$ | 6.2081241869E−09 |
| $A_{14}$ | 2.5484435684E−09 |
| $A_{16}$ | 1.4411288365E−11 |
| $A_{18}$ | 3.1914780755E−11 |
| $A_{20}$ | 1.7498528416E−11 |
| $A_{21}$ | 2.0195053704E−14 |
| $A_{23}$ | 1.7141602857E−13 |
| $A_{25}$ | 2.4828768594E−13 |
| $A_{27}$ | 1.1001411984E−13 |

A center of the image sensor 108 is the fifth origin of the fifth three-dimensional rectangular coordinates system ($x_5$, $y_5$, $z_5$). The image sensor 108 is in an $x_5y_5$ plane of the fifth three-dimensional rectangular coordinates system ($X_5$, $Y_5$, $Z_5$).

The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film.

An effective entrance pupil diameter of the freeform surface off-axial three-mirror image-side telecentric optical system 100 is about 30 millimeters.

The freeform surface off-axial three-mirror image-side telecentric optical system 100 adopts an off-axis field of view in a vertical direction. A field angle of the freeform surface off-axial three-mirror image-side telecentric optical system 100 is about 3°×4°, wherein an angle in a horizontal direction is in a range from about −1.5° to about 1.5°, and an angle in the vertical direction is in a range from about −14° to about −10°.

A wavelength of the freeform surface off-axial three-mirror image-side telecentric optical system 100 is not limited, in one embodiment, the wavelength of the freeform surface off-axial three-mirror image-side telecentric optical system 100 is in a range from about 486 nm to about 656 nm.

An effective focal length (EFL) of the freeform surface off-axial three-mirror image-side telecentric optical system 100 is about 57 millimeters.

A relative aperture (D/f) of the freeform surface off-axial three-mirror image-side telecentric optical system 100 is about 0.526; and a F-number of the freeform surface off-axial three-mirror image-side telecentric optical system 100 is a relative aperture (D/f) reciprocal, the F-number is about 1.9.

Figure 3:
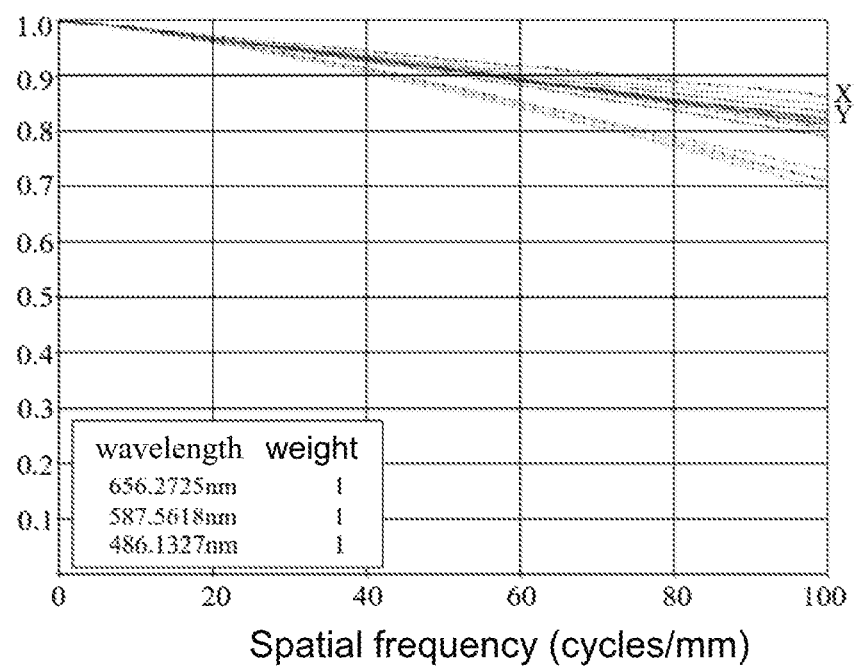
FIG. 3 is a graph showing modulation transfer function curves in Visible light band of partial field angles of a freeform surface off-axial three-mirror image-side telecentric optical system according to one embodiment.

FIG. 3 illustrates the modulation transfer functions (MTF) of partial field angles of the freeform surface off-axial three-mirror image-side telecentric optical system 100 in visible light band are close to the diffraction limit. An MTF curve for each field is higher than 0.69 at 100 lines/mm. It shows that the imaging quality of the freeform surface off-axial three-mirror image-side telecentric optical system 100 is high.

The freeform surface off-axial three-mirror image-side telecentric optical system 100 has advantages as follows:

Compared with conventional refractive telecentric system, the freeform surface off-axial three-mirror image-side telecentric optical system 100 has smaller volume, higher transmittance, higher thermal stability, and lower radiation sensitivity. The use of freeform surfaces effectively reduce the asymmetric aberrations induced by nonsymmetric configuration image-side.

Compared with coaxial reflective systems, the freeform surface off-axial three-mirror image-side telecentric optical system 100 can eliminate central obscuration, and an energy utilization of the freeform surface off-axial three-mirror image-side telecentric optical system 100 is higher.

The field angle of the freeform surface off-axial three-mirror image-side telecentric optical system 100 is about 3°×4°; thereby enabling the freeform surface off-axial three-mirror image-side telecentric optical system 100 to have a larger rectangular field of view, and larger imaging range.

The reflective surface of the primary mirror, the reflective surface of the secondary mirror, and the reflective surface of the tertiary mirror are all freeform surfaces, freeform surfaces have asymmetric surfaces and more degrees of freedom in design, which can reduce asymmetric aberrations and simplify the structure of the optical system. Thus, the asymmetric aberrations of the freeform surface off-axial three-mirror image-side telecentric optical system 100 is small image-side.

The freeform surface off-axial three-mirror image-side telecentric optical system 100 has smaller F-number and larger relative aperture, which allows more light to enter the freeform surface off-axial three-mirror image-side telecentric optical system 100, and enables the freeform surface off-axial three-mirror image-side telecentric optical system 100 to have higher input energy and limiting resolution.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A freeform surface off-axial three-mirror image-side telecentric optical system comprising:
    a primary mirror configured to reflect an object side light to form a first reflected light, and the first reflected light defining a first reflected light path;
    a secondary mirror located on the first reflected light path and configured to reflect the first reflected light to form a second reflected light, and the second reflected light defining a second reflected light path, the secondary mirror being an aperture stop;
    a tertiary mirror located on the second reflected light path and configured to reflect the second reflected light to form a third reflected light, and the third reflected light defining a third reflected light path; and
    an image sensor located on the third reflected light path and configured to receive the third reflected light;
    wherein a first three-dimensional rectangular coordinates system ($x_1$, $y_1$, $z_1$) is defined in space; relative to the first three-dimensional rectangular coordinates system ($x_1$, $y_1$, $z_1$), a second three-dimensional rectangular coordinates system ($x_2$, $y_2$, $z_2$) is defined by a primary mirror location; a third three-dimensional rectangular coordinates system ($x_3$, $y_3$, $z_3$) is defined by a secondary mirror location; and a fourth three-dimensional rectangular coordinates system ($x_4$, $y_4$, $z_4$) is defined by a tertiary mirror location, a fifth three-dimensional rectangular coordinates system ($x_5$, $y_5$, $z_5$) is defined by an image sensor location, and a fifth origin of the fifth three-dimensional rectangular coordinates system ($x_5$, $y_5$, $z_5$) is in (0, 6.13399, −29.9344) position of the first three-dimensional rectangular coordinates system ($x_1$, $y_1$, $z_1$), and an $z_5$-axis positive direction of the fifth three-dimensional rectangular coordinates system ($x_5$, $y_5$, $z_5$) rotates about 9.11067 degrees along the clockwise direction relative to the $z_1$-axis positive direction of the first three-dimensional rectangular coordinates system ($x_1$, $y_1$, $z_1$);

a reflective surface of the primary mirror is a fourth-order polynomial freeform surface of $x_2y_2$ in the second three-dimensional rectangular coordinates system ($x_2$, $y_z$, $z_2$); a reflective surface of the secondary mirror is a sixth-order polynomial freeform surface of $x_3y_3$ in the third three-dimensional rectangular coordinates system ($x_3$, $y_3$, $z_3$); and a reflective surface of the tertiary mirror is a sixth-order polynomial freeform surface of $x_4y_4$ in the fourth three-dimensional rectangular coordinates system ($x_4$, $y_4$, $z_4$).

2. The system as claimed in claim 1, wherein a second origin of the second three-dimensional rectangular coordinates system ($x_2$, $y_2$, $z_2$) is in (0, 49.39999, 122.92696) position of the first three-dimensional rectangular coordinates system ($x_1$, $y_1$, $z_1$).

3. The system as claimed in claim 1, wherein an $z_2$-axis positive direction of the second three-dimensional rectangular coordinates system ($x_2$, $y_z$, $z_2$) rotates about 17.01294 degrees along a clockwise direction relative to an $z_1$-axis positive direction of the first three-dimensional rectangular coordinates system ($x_1$, $y_1$, $z_1$).

4. The system as claimed in claim 1, wherein a third origin of the third three-dimensional rectangular coordinates system ($x_3$, $y_3$, $z_3$) is in (0, 36.69253, −16.46708) position of the first three-dimensional rectangular coordinates system ($x_1$, $y_1$, $z_1$).

5. The system as claimed in claim 1, wherein an $z_3$-axis positive direction of the third three-dimensional rectangular coordinates system ($x_3$, $y_3$, $z_3$) rotates about 0.74805 degrees along a counterclockwise direction relative to an $z_1$-axis positive direction of the first three-dimensional rectangular coordinates system ($x_1$, $y_1$, $z_1$).

6. The system as claimed in claim 1, wherein a fourth origin of the fourth three-dimensional rectangular coordinates system ($x_4$, $y_4$, $z_4$) is in (0, −44.59531, −47.02867) position of the first three-dimensional rectangular coordinates system ($x_1$, $y_1$, $z_1$).

7. The system as claimed in claim 1, wherein an $z_4$-axis positive direction of the fourth three-dimensional rectangular coordinates system ($x_4$, $y_4$, $z_4$) rotates about 22.31491 degrees along the clockwise direction relative to an $z_1$-axis positive direction of the first three-dimensional rectangular coordinates system ($x_1$, $y_1$, $z_1$).

8. The system as claimed in claim 1, wherein the fourth-order polynomial freeform surface of $x_2y_2$ is $$z_2(x_2, y_2) = \frac{c(x_2^2 + y_2^2)}{1 + \sqrt{1 - (1+k)c^2(x_2^2 + y_2^2)}} + A_2 y_2 + A_3 x_2^2 + A_5 y_2^2 + A_7 x_2^2 y_2 + A_9 y_2^3 + A_{10} x_2^4 + A_{12} x_2^2 y_2^2 + A_{14} y_2^4,$$

wherein z represents surface sag, c represents surface curvature, k represents conic constant, while $A_2$, $A_3$, $A_5$, $A_7$, $A_9$, $A_{10}$, $A_{12}$, $A_{14}$ represent term coefficients.

9. The system as claimed in claim 8, wherein c=2.8642059856E-03, k=−3.9274297376E+00, $A_2$=−4.5435688039E-01, $A_3$=−5.3806292422E-04, $A_5$=−4.3722756320E-04, $A_7$=−3.0530404587E-06, $A_9$=2.3737900997E-07, $A_{10}$=8.5265458822E-09, $A_{12}$=1.9066201794E-08, and $A_{14}$=5.7547889567E-09.

10. The system as claimed in claim 1, wherein the sixth-order polynomial freeform surface of $x_3y_3$ is $$z_3(x_3, y_3) = \frac{c(x_3^2 + y_3^2)}{1 + \sqrt{1 - (1+k)c^2(x_3^2 + y_3^2)}} + A_2 y_3 + A_3 x_3^2 + A_5 y_3^2 + A_7 x_3^2 y_3 + A_9 y_3^3 + A_{10} x_3^4 + A_{12} x_3^2 y_3^2 + A_{14} y_3^4 + A_{16} x_3^4 y_3 + A_{18} x_3^2 y_3^3 + A_{20} y_3^5 + A_{21} x_3^6 + A_{23} x_3^4 y_3^2 + A_{25} x_3^2 y_3^4 + A_{27} y_3^6,$$

wherein, $z_3$ represents surface sag, c represents surface curvature, k represents conic constant, while $A_2$, $A_3$, $A_5$, $A_7$, $A_9$, $A_{10}$, $A_{12}$, $A_{14}$, $A_{16}$, $A_{18}$, $A_{20}$, $A_{21}$, $A_{23}$, $A_{25}$, $A_{27}$ represent term coefficients.

11. The system as claimed in claim 10, wherein c=−1.3509388901E-03, k=8.7720946581E+01, $A_2$=2.9521719735E-02, $A_3$=−3.0546252140E-04, $A_5$=−2.5168419021E-05, $A_7$=−3.9838626726E-06, $A_9$=−9.4441737760E-07, $A_{10}$=−3 0.4439768073E-08, $A_{12}$=−4.6398109825E-08, $A_{14}$=−1.5721550120E-08, $A_{16}$=−3 0.0796040892E-10, $A_{18}$=−3.4167907065E-10, $A_{20}$=−8.6127469499E-11, $A_{21}$=−9.4044204706E-13, $A_{23}$=−8.7321134718E-13, $A_{25}$=4.0516919551E-13, and $A_{27}$=5.5914310564E-13.

12. The system as claimed in claim 1, wherein the sixth-order polynomial freeform surface of $x_4y_4$ is $$z_4(x_4, y_4) = \frac{c(x_4^2 + y_4^2)}{1 + \sqrt{1 - (1+k)c^2(x_4^2 + y_4^2)}} + A_2 y_4 + A_3 x_4^2 + A_5 y_4^2 + A_7 x_4^2 y_4 + A_9 y_4^3 + A_{10} x_4^4 + A_{12} x_4^2 y_4^2 + A_{14} y_4^4 + A_{16} x_4^4 y_4 + A_{18} x_4^2 y_4^3 + A_{20} y_4^5 + A_{21} x_4^6 + A_{23} x_4^4 y_4^2 + A_{25} x_4^2 y_4^4 + A_{27} y_4^6,$$

wherein, $z_4$ represents surface sag, c represents surface curvature, k represents conic constant, while $A_2$, $A_3$, $A_5$, $A_7$, $A_9$, $A_{10}$, $A_{12}$, $A_{14}$, $A_{16}$, $A_{18}$, $A_{20}$, $A_{21}$, $A_{23}$, $A_{25}$, $A_{27}$ represent term coefficients.

13. The system as claimed in claim 12, wherein c=−6.0303569933E-03, k=−2.2371952711E-01, $A_2$=−2.2430352958E-03, $A_3$=5.4714931736E-04, $A_5$=5.6853894214E-04, $A_7$=4.4859214867E-07, $A_9$=8.3542437405E-07, $A_{10}$=2.7604507475E-09, $A_{12}$=6.2081241869E-09, $A_{14}$=2.5484435684E-09, $A_{16}$=1.4411288365E-11, $A_{18}$=3.1914780755E-11, $A_{20}$=1.7498528416E-11, $A_{21}$=2.0195053704E-14, $A_{23}$=1.7141602857E-13, $A_{25}$=2.4828768594E-13, and $A_{27}$=1.1001411984E-13.

14. The system as claimed in claim 1, wherein a field angle is about 3°×4°.

15. The system as claimed in claim 14, wherein an angle in a horizontal direction is in a range from about −1.5° to about 1.5°.

16. The system as claimed in claim 14, wherein an angle in the vertical direction is in a range from about −14° to about −10°.

17. The system as claimed in claim 1, wherein a relative aperture is 0.526; and an F-number is 1.9.

18. The system as claimed in claim 1, wherein an effective focal length is about 57 millimeters.

* * * * *